United States Patent Office 3,507,914
Patented Apr. 21, 1970

3,507,914
PROCESS FOR THE PREPARATION OF AROMATIC CARBOXYLIC ACIDS
Toshinobu Kesamaru, Ootake-shi, and Osamu Morita, Tokyo, Japan, assignors to Mitsui Petrochemical Industries, Ltd., Tokyo, Japan, a corporation of Japan
No Drawing. Filed June 14, 1967, Ser. No. 645,897
Int. Cl. C07c 51/20, 51/26
U.S. Cl. 260—524                           11 Claims

ABSTRACT OF THE DISCLOSURE

An improved process for the preparation of aromatic carboxylic acid by liquid phase oxidation of aromatic compound having at least one oxidizable aliphatic substituent with molecular oxygen in the presence of a catalyst system containing heavy metal and bromine under the high temperature and elevated pressure conditions, the improvement of which residing in that silicone as the promotor is caused to be concurrently present in the liquid phase reaction system with the catalyst, and whereby the object product is obtained with improved reaction rate and high yield.

---

This invention relates to an improvement in the liquid phase oxidation process of an aromatic compound or compounds having at least one oxidizable aliphatic substituent with molecular oxygen in the presence of a catalyst system under the high temperature and elevated pressure conditions to produce the corresponding aromatic carboxylic acid or acids, and whereby the object product is obtained with improved reaction rate and high yield. Also as the incidental effect, the uniformity of the reaction is improved to allow regular operation of the reaction procedure, and furthermore with the subject improved process even from such starting aromatic compounds having a plural number of oxidizable aliphatic substituents, the corresponding aromatic carboxylic acids can be prepared with industrial advantage.

More particularly, the invention relates to the process for the preparation of aromatic carboxylic acids as above, the improvement therein residing in that, besides the said catalyst system, silicones are caused to be concurrently present in the liquid phase reaction system as a promotor.

Heretofore, liquid phase oxidation of an aromatic compound having at least one oxidizable aliphatic substituent with molecular oxygen under the high temperature and elevated pressure conditions, in the presence of a catalyst system such as of a heavy metal, for example, cobalt, manganese, nickel, or of such a heavy metal and bromine, to produce the corresponding aromatic carboxylic acid is known.

In that conventional method, however, still numbers of problems to be solved are present with respect to reaction rate and yield, and improvements in those points without any limitation to the starting material have been sought after.

The yield could be increased to a certain level by the concurrent use of the heavy metal catalyst and bromine. However, for the oxidation of starting aromatic compound having a plurality of oxidizable aliphatic substituents, high reaction temperature and long reaction period are required before complete oxidation of all of the substituents, and therefore such a reaction process is neither satisfactory.

Furthermore, the above reaction method is apt to produce a side product of which separation from the object product is difficult, and also its control to achieve uniform and regular reaction performance is by no means easy. Consequently, adoption of high reaction temperature and/or long reaction time is disadvantageous to the purity of the product, although such may seem to achieve high yield of the object product.

For instance, in a typical example of oxidation of p-xylene to make terephthalic acid, it is not very difficult to produce terephthalic acid of seemingly high purity with good yield, but we often encounter the case when such terephthalic acid is used as the material for polyester, the product polyester is qualitatively non-uniform and inferior. Consequently, still varied efforts are being made for the provision of so-called "fiber grade" terephthalic acid at the contemporary technical level.

The above being only one example, we searched for the improvement generally of the afore-described conventional method to arrive at a knowledge that the reaction rate as well as the yield can be improved by performing the said liquid phase oxidation in the presence of a minor amount of a promotor. Furthermore we found that, without high reaction temperature or specific limitation on the starting material, by the subject process the uniformity of the reaction is improved to make a regular reaction control possible, and also the quality of the resultant aromatic carboxylic acid is satisfactory.

We also found that, as the promotor, silicone is highly useful.

The precise mechanism by which silicone advantageously functions as the promotor for the reaction system and method of the oxidation contemplated in this invention is not yet clear, but its effectiveness is conspicuous as later demonstrated by means of comparison with control examples.

Accordingly, the object of the present invention is to provide an improved process for the preparation of aromatic carboxylic acids by means of the afore-described liquid phase oxidation method.

Still other objects and advantages of the invention will become apparent from reading the following descriptions.

The silicone caused to be concurrently present in the liquid phase reaction system as a promotor, besides the heavy metal and bromine as the catalyst, in accordance with the invention appears to contribute to increase the rate of reaction.

The silicone may also be called as siloxane and has the basic structure represented by the formula below.

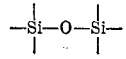

More specifically, the known silicon includes, besides the low molecular compounds having simple structure such as hexamethyldisiloxane, and octamethyltrisiloxane, polysiloxanes of higher molecular weights. In the invention, silicones of varying molecular weights over considerably wide range can be used. Again as the substiuent to be bonded with silicon atom, hydrogen, alkyl group such as methyl and ethyl, phenyl group and halogenated alkyl group may be named. Among the named substituents those which are relatively chemically stable such as methyl group, phenyl group are preferred, but the substituent is not critical. Furthermore, both chain siloxane and cyclic siloxane can be used. The siloxane compounds employed in the invention are liquid or creamy at room temperature, and accordingly vulcanized silicone rubber and silicone resin having high molecular weights are unsuitable for the purpose.

Thus it should be understood that vulcanized silicone rubber and silicone resin are excluded from the scope of "silicone" referred to in the present invention.

According to the process of this invention, silicones which are liquid under the reaction temperature and pressure conditions, inter alia, those having molecular weights of normally 400 or above and which are liquid under the reaction temperature and pressure conditions are preferred. Silicones which become gaseous under the said conditions may also be employed, however, if there is provided an additional means which condenses gaseous silicones evaporated off and recycles the condensate into reaction system.

Specific examples of the silicones useful for the invention include octamethyltrisiloxane, methylhydropolysiloxane, methylalkylpolysiloxane (the alkyl group having 1–10 carbon atoms), methylphenylpolysiloxane, diethylpolysiloxane and methylfluoroalkylpolysiloxane (the fluoroalkyl group having 1–4 carbon atoms).

According to the invention, the silicone compound as described above is caused to be present in the liquid phase reaction system concurrently with the catalyst system, in an amount ranging 0.0001–2% by weight, preferably 0.001–0.2% by weight to the starting aromatic compound. At the quantity below the above lower limit, its performance as the promotor tends to be degraded, and on the other hand use of a quantity greater than the said upper limit in no way contributes to increase the reaction rate. For these reasons, silicone is used at the quantity within the above-specified range with satisfactory result.

Because the silicone serves to increase the reaction rate in the reaction system and method contemplated in this invention, it is thought to function as a promotor for the said reaction system and method, but the precise mechanism of its performance is not yet clear. However, upon comparing the results of the subject process with those of the reactions run in exactly the same manner except that the concurrent presence of silicone is omitted, as to conversion within a predetermined length of time, purity and color tone of the product, and reproducibility of the reaction, it can be understood that the improvement achieved by the subject invention is highly valuable from industrial standpoint.

As the starting aromatic compounds useful for the invention, the compounds having at least one, preferably 1–3 oxidizable aliphatic substituents may be named. The aromatic ring may be either benzene or naphthalene ring, the compounds having benzene ring being preferred.

As the oxidizable aliphatic substituent, any of alkyl, aldehyde and alcohol residual groups can be used. Particularly the compounds in which the substituent is an alkyl group of 1–3 carbon atoms are the preferred starting material. Of course the starting aromatic compounds may contain, besides these oxidizable aliphatic substituents, other substituents which do not participate in the oxidation under the reaction conditions. As such other substituents, for example, carboxyl group, nitro group and halogen atom may be named.

As some of the specific examples of those starting aromatic compounds, the following may be named: alkylbenzenes such as toluene, ethylbenzene, cumene, xylene, diisopropylbenzene and pseudocumen; aromatic alcohols and aldehydes such as benzyl alcohol, benzaldehyde, methylbenzyl alcohol and terephthalaldehyde. And as the compounds concurrently possessing other substituents which do not participate in the oxidation reaction, aromatic carboxylic acids such as toluic acid and alkylbenzene derivatives such as chlorotoluene may be named.

Among the above-listed exemplary compounds, for example, toluene, ethylbenzene, cumene, xylene, diisopropylbenzene, pseudocumene and toluic acid are the preferred starting materials.

The starting materials as above-described may be used either alone or as a mixture of a plurality of specific compounds.

The present invention can be particularly advantageously applied to the preparation from di-alkyl substituted aromatic compounds, for example, p-xylene, of the corresponding aromatic dicarboxylic acids, for example, terephthalic acid.

The reaction is performed in accordance with the known liquid phase oxidation method in which the oxidation progresses with the introduction of molecular oxygen into the liquid phase reaction system in the presence of the catalyst system under the high temperature and elevated pressure conditions.

While solvent is not always required in case the acid to be produced is liquid under the reaction conditions and serves as a solvent, normally the use of solvent as the reaction medium is preferred.

The type of solvent is not critical so far as it is stable or inert to the oxidation reaction under the reaction conditions. It is also feasible to employ a plural number of, for example two, starting components to let one of them serve as the solvent for the other, whereby producing two types of each corresponding carboxylic acid.

As the solvent, lower fatty acids, aromatic carboxylic acids, aromatic hydrocarbons and halogenated hydrocarbons can be used, among which lower fatty acids being preferred. The lower fatty acids having in their molecules 1–8 carbon atoms are well adapted for the use in this invention. Inter alia, saturated fatty acids having in their molecules 2–4 carbon atoms such as, for example, acetic, propionic and n-butyric acids are the most preferred.

The amount of the solvent is, when an aliphatic monocarboxylic acid is used, suitably within the range of 1–15 parts, preferably 3–10 parts, by weight per part of the material to be oxidized.

The reaction is performed under freely variable heating conditions so far as occurrence of such phenomena as carbonation of the object product or formation of tar-like substance is avoided, the employable temperature normally ranging 150–300° C., preferably in the order to 180–250° C.

The reaction pressure is variable depending on such factors as the starting material and the solvent, but it can be freely controlled in accordance with itself known means as to the liquid phase oxidation, within the range to maintain the reaction system at liquid phase. Normally it may range from atmospheric to 100 kg./cm.$^2$ (gauge pressure: unless otherwise indicated in this specification pressure is expressed as gauge pressure), preferably 10–50 kg./cm.$^2$.

As the catalyst, catalysts known per se may be employable, but in this invention the catalyst system composed of heavy metal and bromine is adopted.

As the heavy metal catalyst, for example, nickel, cobalt, iron, chromium and manganese may be named, particularly cobalt and/or manganese being preferred. As already known, both those heavy metals and bromine can be used in any form as element, ion or compound. It is preferred, however, that their form should be soluble in the starting compound and/or the reaction medium.

For instance, catalyst systems as below can be advantageously used. To wit, examples of heavy metals as the catalyst include bromides or carboxylates of manganese or cobalt such as bromide, acetate and naphthenate of manganese or cobalt. Whereas, those of bromine as the catalyst include ammonium bromide, ethane tetrabromide and benzyl bromide.

Accordingly, "heavy metal and bromine as the catalyst system" referred to in the invention embraces all of these known forms.

As the amount of the catalyst, that ranging in the order of 0.005–5% by weight, preferably 0.02–2% by weight, of the heavy metal (in case the heavy metal is in the form of a compound, in terms of the metal) to the starting aromatic compound is normally sufficient. Obviously a greater amount may be used if desired, without however appreciable advantage, and accordingly the amounts within the above range are customarily employed. Again the amount of bromine can be varied depending on the amount of the heavy metal catalyst. The most frequently employed ratio between the metal and bromine ranges 0.1–10 grams-atom of bromine per 1 gram-atom of the metal. Of course the foregoing are simply the description of conventionally employed quantitative conditions and are not critical for the invention.

Also as the molecular oxygen to be introduced into the liquid phase reaction system, air is the most practical, while pure oxygen gas, oxygen-enriched air, or oxygen gas diluted with an inert gas such as nitrogen or carbon dioxide, can also be used.

Accordingly, the "molecular oxygen" referred to in the present process embraces also those molecular oxygen-containing gases.

The amount of oxygen to be supplied into the reaction system should be at least sufficient to oxidize the oxidizable substituent in the starting material to carboxyl group. For example, in case the substituent is methyl radical, 1.5 molecules of oxygen per 1 methyl radical is required. However, supply of an excessive amount of molecular oxygen, viz, the amount more than necessary for the oxidation, not only shortens the reaction time but also reduces the formation of impurities produced in the oxidation reaction, and thus contributes to the preparation of aromatic carboxylic acid with high yield. For this reason supply of more than stoichiometric amount of molecular oxygen is preferred. For that purpose, the molecular oxygen is supplied at such a rate as will cause the exhaust gas discharged from the reaction zone to contain a certain amount of oxygen which is not consumed. However when the supply rate is too great, the result will be that the greatest part of the oxygen is discharged without the sufficient staying time for consumption. In such a state, the discharged gas may form an explosive mixture with the reactant or a part of the solvent withdrawn with the said gas, and renders the operation highly hazardous. Accordingly, in practice it is preferred to perform the reaction in such a state in which the rate of oxygen supply is excessive to such an extent that the most of the oxygen in the gaseous supply should be consumed for the reaction. The supply amount should be varied depending also on the type of the catalyst employed.

The subject process can be practiced in any of batch, intermittent or continuous system.

Thus, for example, isophthalic acid from methaxylene, terephthalic acid from paraxylene, benzoic acid from toluene and trimelitic acid from pseudocumene, can be prepared with industrial advantage.

Hereinafter some of the embodiments of the invention will be given by means of working examples with controls for comparison purpose. Since it is apparent that many changes and modifications can be made in those given embodiments without departing from the nature and spirit of the invention, it is to be understood that the invention is not to be limited thereto except as set forth in the appended claims.

EXAMPLES 1–6 AND CONTROLS 1–2

A titanium autoclave provided with a stirrer, a reflux condenser and an air inlet tube was charged with p-xylene, acetic acid, the catalyst system and silicone as the promotor. The reaction was performed while blowing air as the molecular oxygen into the liquid phase zone containing the foregoing substances, under heating. During the reaction the exhaust gas was discharged through the condenser to maintain the pressure of the reaction zone constantly at 25 kg./cm.$^2$. Analyzing the oxygen concentration in the discharged gas, the termination of the reaction could be determined.

After completion of the reaction, the air supply was stopped, and the reaction system was cooled and filtered to separate the solid reaction product.

The results were as given in Table 1 below, in which the results of control runs, performed in exactly the same manner as of the examples except that silicone was not used, are also given.

TABLE 1

| | p-Xylene, grams | Acetic acid, grams | Catalyst, grams | Promotor, grams | Reaction temp., °C. | Air supply speed, l/hr. | Time needed until the completion of reaction min. | Yield of terephthalic acid, percent by weight | Purity of terephthalic acid | APHA color of terephthalic acid |
|---|---|---|---|---|---|---|---|---|---|---|
| Example 1 | 40 | 300 | Manganese acetate (0.30). Cobalt acetate (0.15). Ammonium bromide (0.20). | Methyl polysiloxane (0.04). | 220 | 350 | 30 | 92 | 99.9 | 30 |
| Example 2 | 40 | 300 | ___do___ | ___do___ | 220 | 350 | 29 | 91 | 99.9 | 33 |
| Example 3 | 40 | 300 | ___do___ | ___do___ | 220 | 350 | 30 | 91 | 99.9 | 30 |
| Example 4 | 40 | 300 | ___do___ | Octamethyl trisiloxane (0.04). | 220 | 350 | 31 | 90 | 99.8 | 34 |
| Control 1 | 40 | 300 | ___do___ | | 220 | 350 | 38 | 86 | 99.0 | 70 |
| Example 5 | 50 | 200 | Manganese maphthenate (1.0). Cobalt naphthenate (0.50). Tetrabromo ethane (0.30). | Diethyl polysiloxane (0.08). | 190 | 350 | 36 | 89 | 99.2 | 50 |
| Example 6 | 50 | 200 | ___do___ | Methyl fluoroethyl polysiloxane (0.06). | 210 | 350 | 33 | 91 | 99.6 | 40 |
| Control 2 | 50 | 200 | ___do___ | | 210 | 350 | 42 | 85 | 98.5 | 80 |

NOTE.—In the table, the purity of terephthalic acid was determined by weighing terephthalic acid as its barium salt. APHA colour of terephthalic acid is determined by dissolving 2.5 of the terephthalic acid with 100 ml. of 1N sodium hydroxide solution, followed by comparing color of the resultant solution with American Public Health Association (APHA) standards.

EXAMPLES 7–13 AND CONTROLS 3–6

Example 1 was repeated except that the type of the starting aromatic compound was varied. The results are given in Table 2.

| | Starting aromatic compound, grams | Acetic acid, grams | Catalyst, grams | Promotor, grams | Reaction temp., °C. | Air supply speed, l./hr. | Time needed until the completion of reaction, (min.) | Obtained carboxylic acid yield, (Percent by weight | Purity of obtained carboxylic acid, percent | APHA color of obtained carboxylic acid [2] |
|---|---|---|---|---|---|---|---|---|---|---|
| Example 7 | Toluene (100) | (1) | Cobalt naphthenate (1.0) Manganese naphthenate (2.0) Benzyl bromide (0.5) | Methylphenyl polysiloxane (0.08) | 200 | 400 | 35 | Benzoic acid (96) | 99.8 | (3) |
| Example 8 | Cumene (50)g | 200 | Manganese acetate (0.50) Ammonium bromide (0.40) | Methylethyl polysiloxane (0.04) Methylphenyl polysiloxane (0.04) | 190 220 | 400 350 | 40 27 | Benzoic acid (90) Isophthalic acid (95) | 98.1 100 | 100 40 |
| Example 9 | m-Xylene (40) | 200 | Cobalt acetate (0.15) | | 220 | 350 | 34 | Isophthalic acid (88) | 99.1 | 70 |
| Control 3 | ...do... | 200 | Cobalt acetate (0.15) | | | | | | | |
| Example 10 | p-Diisopropylbenzene (40) | 300 | Manganese bromide (0.80) | Methyl polysiloxane (0.05) | 210 | 400 | 45 | Terephthalic acid (75) | 96.6 | 200 |
| Control 4 | ...do... | 300 | do | | 210 | 400 | 54 | Terephthalic acid (67) | 92.3 | 350 |
| Example 11 | Pseudo cumene (40) | 250 | Cobalt naphthenate (0.50) Manganese naphthenate (1.0) Tetrabromoethane (0.40) | Methylpolysiloxane (0.06) | 210 | 350 | 40 | Trimellitic acid (92) | 98.6 | 160 |
| Control 5 | ...do... | 250 | Cobalt naphthenate (0.50) Tetrabromoethane (0.40) | | 210 | 350 | 48 | Trimellitic acid (84) | 93.7 | 300 |
| Example 12 | Paratoluic acid (40) | 250 | Manganese acetate (0.30) Ammonium bromide (0.20) | Methyl polysiloxane (0.04) | 200 | 300 | 24 | Terephthalic acid (94) | 99.8 | 45 |
| Control 6 | ...do... | 250 | Cobalt naphthenate (0.30) Manganese acetate (0.30) Ammonium bromide (0.20) | | 200 | 300 | 29 | Terephthalic acid (89) | 98.8 | 80 |
| Example 13 | p-Methylbenzyl alcohol (40) | 200 | Cobalt naphthenate (1.3) Ammonium bromide (0.30) | Methylphenyl polysiloxane (0.05) | 210 | 350 | 38 | Terephthalic acid (80) | 97.8 | 160 |

[1] To shorten the induction period, 5 g. benzoic acid was added.
[2] APHA color of obtained carboxylic acid is determined by dissolving 2.5 g. of the carboxylic acid with 100 ml. aqueous solution containing equivalent sodium hydroxide, followed by comparing the color of the resultant solution with American Public Health Association (APHA) standards.
[3] Because of mixing the catalyst residue, APHA color did not appear.

We claim:

1. In a process for the preparation of aromatic carboxylic acid by liquid phase oxidation of aromatic compound having at least one oxidizable aliphatic substituent with molecular oxygen in the presence of a catalyst system containing a heavy metal selected from cobalt, manganese and nickel and bromine under the high temperature and elevated pressure conditions, the improvement residing in that an organo-siloxane which under the conditions of the reaction is either liquid or vapor is caused to be concurrently present as the promotor in the liquid phase reaction system with the catalyst.

2. The process of claim 1 in which the aromatic compound has 1–3 of the said substituent.

3. The process of claim 2 in which the said substituent is a radical selected from the group consisting of alkyl, aldehyde and alcohol residual groups.

4. The process of claim 3 in which the said substituent is an alkyl group of 1–3 carbon atoms.

5. The process of claim 4 in which the aromatic compound is selected from the group consisting of toluene, ethylbenzene, cumene, xylene, diisopropylbenzene, pseudocumene and toluic acid.

6. The process of claim 1 in which the organo-siloxane as the promotor is that having a molecular weight of no less than 400 and which is liquid under the reaction temperature and pressure conditions.

7. The process of claim 1 in which the organo-siloxane as the promotor is that which forms a gas under the reaction temperature and pressure conditions, the said gas being condensable and can be recycled into the reaction system.

8. The process of claim 1 in which the organo-siloxane as the promotor is present within the quantitative range of 0.0001–2% by weight to the starting aromatic compound.

9. The process of claim 1 in which the heavy metal in the catalyst is manganese and/or cobalt.

10. The process of claim 1 in which the oxidation reaction is performed in the presence of a lower fatty acid having in its molecule 2–4 carbon atoms.

11. The process of claim 10 in which the lower fatty acid is acetic acid.

References Cited

UNITED STATES PATENTS 1,694,122  12/1928  Jaeger _____ 260—524

FOREIGN PATENTS 296,071  1/1929  Great Britain.

LORRAINE A. WEINBERGER, Primary Examiner

R. S. WEISSBERG, Assistant Examiner

U.S. Cl. X.R.

260—523